2 Sheets—Sheet 1.

W. W. HUBBARD.
CORN-PLANTER.

No. 180,031.      Patented July 18, 1876.

WITNESSES:
J. Wm Garner
F. M. Burnham

INVENTOR:
W. W. Hubbard
per
F. A. Lehmann, Atty

2 Sheets—Sheet 2.
W. W. HUBBARD.
CORN-PLANTER.
No. 180,031. Patented July 18, 1876.
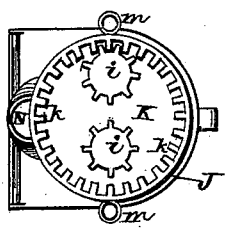
Fig. 4.
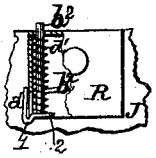
Fig. 5.
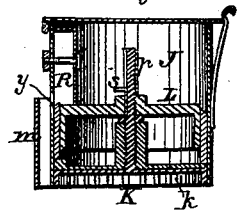
Fig. 6.
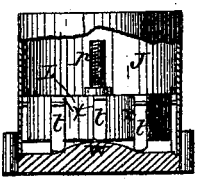
Fig. 7.
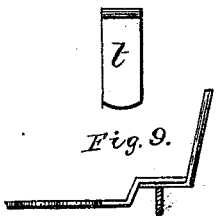
Fig. 8.
Fig. 9.
WITNESSES:
J. Wm. Garner
G. W. Gibbons.
INVENTOR:
W. W. Hubbard
per
F. A. Lehmann, Atty

UNITED STATES PATENT OFFICE.

WILLIAM W. HUBBARD, OF EDINBURG, INDIANA, ASSIGNOR OF ONE-HALF HIS RIGHT TO JOSEPH BEATTY, OF SAME PLACE.

IMPROVEMENT IN CORN-PLANTERS.

Specification forming part of Letters Patent No. 180,031, dated July 18, 1876; application filed June 28, 1876.

*To all whom it may concern:*

Be it known that I, WILLIAM W. HUBBARD, of Edinburg, in the county of Johnson and State of Indiana, have invented certain new and useful Improvements in Corn-Planters; and I do hereby declare the following to be a full, clear, and exact description of the invention, such as will enable others skilled in the art to which it pertains to make and use it, reference being had to the accompanying drawings, which form part of this specification.

The nature of my invention consists in the construction and arrangement of a corn-planter, as will be hereinafter more fully set forth.

Figure 1:
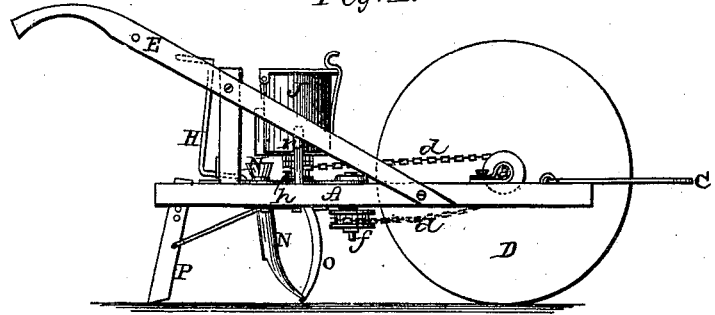
Figure 2:
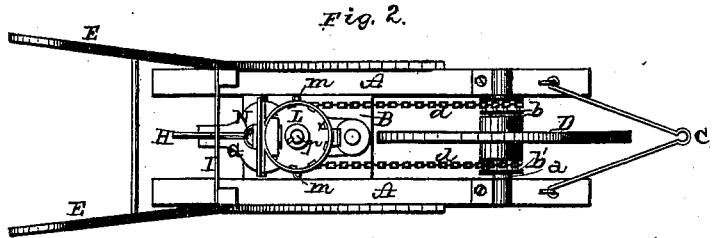
Figure 3:
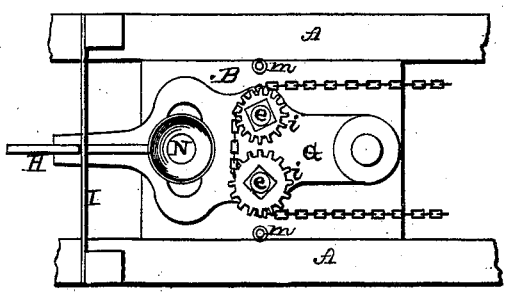

In the accompanying drawings, which fully illustrate my invention, Figure 1 is a side elevation of my invention. Fig. 2 is a plan view of the same. Fig. 3 is a plan view of the shifting-gear alone. Fig. 4 is an inverted view of the grain-box; and Figs. 5, 6, 7, 8, and 9 are detail views of the same.

A A represent two parallel beams connected by means of a platform, B, and provided with the draft-clevis C and handles E E, arranged in any suitable manner. Between the front ends of the beams A A is a wheel, D, secured on an axle, $a$, which has its bearings in suitable slotted boxes on said beams. On the axle $a$ are two pulleys, $b$ $b^1$, one on each side of the wheel. The pulley $b$ is toothed and fast on the axle, while the pulley $b^1$ is smooth, and is loose on the axle. Around these pulleys is passed an endless chain, $d$, as follows: From the pulley $b$ at the top the chain passes rearward and around two pulleys, $h$ $h$, which are also toothed, so as to engage with the chain and be turned by it. From these pulleys the chain passes forward and around the pulley $b^1$, and thence backward around a retaining-pulley, $f$, on the under side of the platform, and then forward to the pulley $b$. The pulleys $h$ $h$ are placed upon vertical spindles $e$ $e$ secured to a plate, G, which is laid upon and pivoted to the platform B at the front end of the plate. These pulleys are provided with pinions $i$ $i$ of unequal diameter, which are to be brought, one at a time, into gear with the dropping mechanism for operating the same. This is accomplished by simply turning the plate G either to the right or left, throwing either one or the other of the pinions in gear, thereby regulating the speed of the dropping mechanism and the consequent distance between the grains while the machine is in motion. The plate is held in position by means of a handle, H, that engages in either one of three or more notches made in the top or bottom edge of a cross-bar, I, which connects the standards that support the handles E E, as shown. When the handle H is in the center notch both pinions are out of gear, but when it is in either one of the side notches one of the pinions is in gear with the dropping mechanism. J represents the hopper or corn box, provided on its sides with loops or sockets $m$ $m$, which are placed over vertical rods $n$ $n$ that are fast in the platform B, so that the box can at any time be lifted off when it is desired to remove the pinions $i$ $i$ and exchange them for others of different size. With only two pinions the machine can only plant in two ways, or with the grains at only two different distances apart; but by making the box removable and exchanging the pinions the grains may be planted at any desired distance apart. On the box J is a circular movable bottom, K, provided with an internal cog-gear, $k$, into which the pinions $i$ are to engage for rotating the dropping mechanism. From the center of the bottom K rises a vertical screw, $p$, upon which the dropping-disk L is secured. This disk L is in the form of an inverted cap, having a series of vertical grooves, $x$ $x$, in its periphery at suitable equal distances apart. The disk L is adjustable vertically on the screw $p$, and held at any point desired by means of a key, $s$. This vertical adjustment of the dropping-disk is of great importance when there are several kinds of corn used, some having large grains and some having small. In each of the grooves $x$ in the dropping-disk L is placed a vertical slide, $t$, which serves the double purpose of discharging the corn and regulating the size of the cavity, and which is carried around by the disk, said slides resting upon the bottom K, and leaving at their upper ends in the grooves $x$ sufficient room to receive one grain edgewise of the corn used, the dropping-slide having been previously adjusted as described. In the back part of the hopper or box J is a stationary cam, $w$, over which the slides $t$, having their lower ends rounded and their upper ends beveled, as shown, must ride, and as each slide in succession passes over this cam it is raised thereby, discharging the grain of corn out of the groove $x$, said grain falling through an aperture, $y$, from the inclined surface of the slide into a funnel, $m$, on the rear side of the box, and through said funnel into and through a conductor, N, to the ground. The conductor N is arranged under the platform B, and has a furrow-opener, O, attached to it, as shown. Behind the conductor are suitable coverers P P. Within the corn-box J, above the exit-opening $y$, is secured a box or frame, R, containing the cut-off $a'$ consisting of an L-shaped metal piece placed at one end of the box R, which is slotted to allow the cut-off to rise and fall, as required. The vertical part of the cut-off $a'$ is on the outside of the box R, while the horizontal part extends inward at the bottom thereof, and this latter part has a rod, $b^2$, attached to it. The rod $b^2$ extends upward through the top of the box, and has a spiral spring, $d'$, surrounding it within the box, as shown. The spring $d'$ holds the cut-off down to its work, and at the same time allows it to yield to any grain of corn that projects above the dropping-disk L. At the front end of the horizontal part is a downward projection, 1, which passes readily over each grain of corn, while from the rear end projects the wing 2, which serves to hold the grains down and prevent them from bouncing out after the projection 1 has slipped over them.

If desired, the upper end of the rod $b^2$ may be made screw-threaded, and a nut placed upon it, so as to regulate the distance at which the horizontal part shall be held above the bottom.

Having thus fully described my invention, what I claim as new, and desire to secure by Letters Patent, is—

1. The combination, in a corn-planter with the driving-wheel D and its axle $a$, of the fast pulley $b$, loose pulley $b^1$, chain $d$, one or more pulleys, $h\ h$, and the retaining-pulley $f$, all substantially as and for the purposes herein set forth.

2. In a corn-planter, two pinions of unequal size, in combination with a movable plate or frame, and gearing on the bottom of the hopper, so that either pinion may be thrown in gear with the dropping mechanism for operating the same fast or slow, as herein set forth.

3. The combination of the pivoted plate G with spindle $e\ e$, the pinions $i\ i$ of unequal size, chain $d$, the handle H, and notched cross-bar I, substantially as and for the purposes herein set forth.

4. The combination of the hopper J, rotating bottom K, with internal cog-gear $k$ on its under side, the central screw $p$, disk L, with vertical grooves $x$, and a fastening device, substantially as and for the purposes herein set forth.

5. The combination of the rotating bottom K, grooved disk L, slides $t$, and cam W, as and for the purposes herein set forth.

6. The combination of the slotted box R, L-shaped cut-off $a'$, rod $b^2$, and spring $d'$, as and for the purposes herein set forth.

In testimony that I claim the foregoing I have hereunto set my hand this 28th day of June, 1876.

W. W. HUBBARD.

Witnesses:
R. M. BARR,
F. A. LEHMANN.